UNITED STATES PATENT OFFICE.

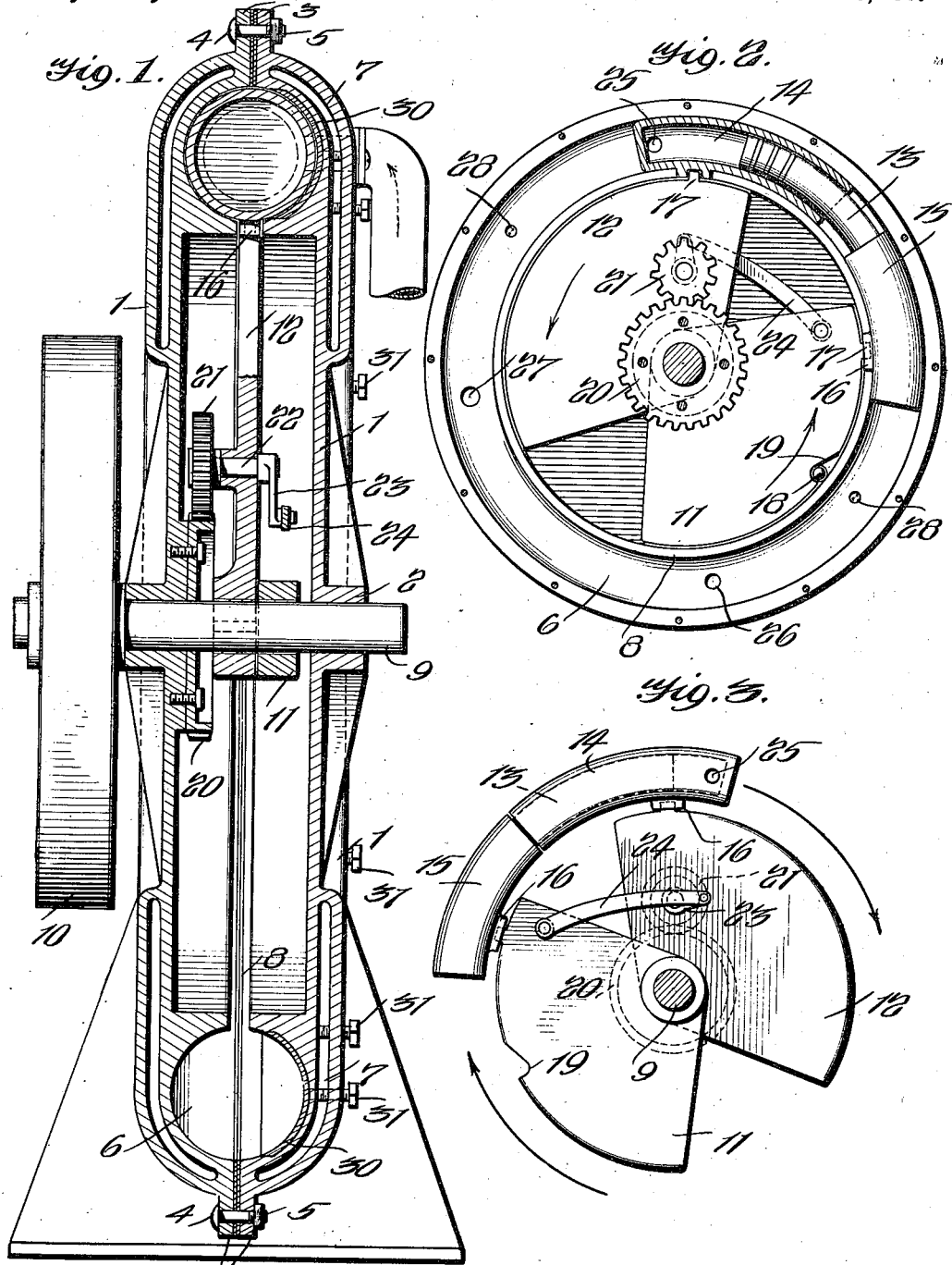

SAMUEL HENDERSON GRIMMETT AND FRED GOETTE, OF CALDWELL, IDAHO.

INTERNAL-COMBUSTION ENGINE.

1,250,859.

Specification of Letters Patent.  Patented Dec. 18, 1917.

Application filed April 13, 1917. Serial No. 161,714.

*To all whom it may concern:*

Be it known that we, SAMUEL HENDERSON GRIMMETT and FRED GOETTE, citizens of the United States, and residents of Caldwell, in the county of Canyon and State of Idaho, have invented a new and useful Improvement in Internal-Combustion Engines, of which the following is a specification.

Our invention is an improvement in internal combustion engines and has for its object to provide a device of the character specified, wherein an annular chamber is provided, in which moves the cylinder and the piston, the cylinder and piston being so connected that they will have relative movement toward each other to compress the charge during their movement in the chamber.

In the drawings:—

Figure 1 is a vertical section of the improved engine,

Fig. 2 is a reduced view of one-half of the casing,

Fig. 3 is a similar view of the cylinder and piston and connections.

In the present embodiment of the invention a casing is provided consisting of similar sections 1 which have central bearings 2 and are connected at their peripheries by marginal flanges 3, bolts 4 being passed through the flanges to connect the same, and the bolts are engaged by nuts 5. An annular chamber 6 is formed at the periphery of the casing, the said chamber being jacketed as shown at 7. Packings 8 are arranged between the sections of the casing outside the chamber and the chamber communicates with the space between the sections and inside the chamber by an annular slot or passage 8ª as shown in Fig. 1.

A shaft 9 is journaled at the axis of the casing in the bearings 2, the said shaft having the usual fly wheel 10, outside the casing, and inside the casing two segmental plates 11 and 12 are mounted on the shaft, the segment 12 being keyed to the shaft while the segment 11 is loose thereon. A piston 13 is connected with the segment 11 and a cylinder 14 with the segment 12. Both cylinder and piston are arc-shaped to fit the passage 6, and the piston 13 which has the usual packing rings is provided with a head 15, for connection with the segment 11.

The cylinder 14 and head 15 have bosses 16, each boss having a recess which is engaged by a pin 17 in the segment. The bosses extend through the slot or passage 8ª and it will be evident that when the cylinder moves, the segment 12 will be carried thereby, carrying also the shaft 9. The segment 11 is constrained to move forwardly by a ball 18, which is arranged within a notch or recess 19 in the periphery of the segment, the said notch having one wall abrupt and the other inclined, so that the ball will be compressed between the periphery of the segment and the inner surface of the casing to prevent the segment moving in one direction. In the other direction it may move freely without interference from the ball.

A gear wheel 20 is secured to one of the sections of the casing, in the present instance that section adjacent to the fly wheel 10, and this gear wheel is engaged by a pinion 21 on a crank shaft 22 journaled in the segment 12. The crank 23 of the crank shaft is connected by a link 24 with the segment 11. It will be evident that when the shaft rotates the pinion 21 will run around the gear wheel 20 and the crank shaft to which the pinion is secured will be rotated. When the crank is in the position of Fig. 2 further movement of the pinion will cause the segment 11 to move toward the segment 12 in a direction to cause the piston to move into the cylinder and this movement will continue until the crank is in register with the link and in approximately the position of Fig. 2.

As soon as the crank passes the dead center and begins to move toward the segment 11, the piston and cylinder will begin to separate and this separation will continue until the piston is at the end of its outward movement.

The cylinder is provided with an inlet 25, which is adapted to register with inlet ports 26 in the section of the casing remote from the fly wheel and with exhaust ports 27 in the same section of the casing. The inlet ports are in the same diametrical line as are also the two exhaust ports and the line through the exhaust ports is at right angles to the line through the inlet ports. Thus each inlet is separated from the adjacent exhaust by arcs of ninety (90) degrees and at approximately the center of those arcs in advance of the inlets 26 igniting devices 28 are provided, in the present instance, spark plugs.

The connection between the segments 11 and 12 is such that when the port 25 of the cylinder is in register with an intake port 26 the piston will be moved outward to draw in the charge. As the piston moves inward the charge will be compressed by the inward movement of the piston, the end of the compression occurring as the port 25 registers with a spark plug. The segment 12 will be driven forward under the impulse of explosion since the segment 11 cannot move rearwardly, being locked against rearward movement by the ball 18, and as the port 25 reaches the exhaust port 27 the piston will again be moved inward, driving out the charge. The arrangement is such that the piston moves into and out of the cylinder once during its passage through an arc of forty-five (45) degrees.

In operation, when the cylinder passes an inlet port a charge will be drawn in for the cylinder at this moment will be moving at a higher rate of speed than the piston. The charge will be compressed, compression being completed at the moment the inlet port of the cylinder registers with a spark plug. The explosion of the charge will drive the segment 12 ahead, and when the port 25 registers with the exhaust the segment 11 will be moving at a relatively greater speed than the segment 12 and the exhaust products will be exhausted.

Means is also provided for compensating for wear of the stator casing. The said means comprises a shell 30 arranged within one of the sections of the stator casing and adapted to be moved toward or away from the opposite section by means of set screws 31 which are threaded through the casing. This shell is curved to fit the annular chamber 6.

It will be evident that by using different gear ratios, a different number of explosions may be had and they may also be obtained by adding another cylinder and piston. For instance, there might be three explosions in one revolution and by adding another piston there would be six explosions in the revolution. The improved motors may also be used in series on the same shaft.

We claim:—

1. An engine of the character specified comprising a casing having an annular passage, a shaft journaled at the axis of the passage, a pair of segments mounted on the shaft, one of the segments being keyed to the shaft and the other loose thereon, a cylinder in the annular passage and connected with the first named segment to move therewith, a piston coöperating with the cylinder and connected with the other segment and moving therewith, means in connection with said other segment for preventing reverse movement thereof, the casing having at the annular passage oppositely arranged inlet ports and oppositely arranged exhaust ports between the inlet ports and having an igniting device between each inlet port and the succeeding exhaust port, said cylinder having a port adapted to register with the inlet and exhaust ports and with the igniting devices, and a connection between the segments for moving the piston segment relatively to the cylinder segment to cause the piston to move into and out of the cylinder once during the travel of the cylinder through an arc of 90 degrees, said connection comprising a crank shaft journaled in the cylinder segment, a link connecting the crank of the shaft to the piston segment, a pinion secured to the crank shaft and a gear wheel secured to the casing concentric with the engine shaft and meshing with the pinion.

2. An engine of the character specified comprising a casing having an annular passage, a shaft journaled at the axis of the passage, a pair of segments mounted on the shaft, one of the segments being keyed to the shaft and the other loose thereon, a cylinder in the annular passage and connected with the first named segment to move therewith, a piston coöperating with the cylinder and connected with the other segment and moving therewith, means in connection with said other segment for preventing reverse movement thereof, the casing having at the annular passage oppositely arranged inlet ports and oppositely arranged exhaust ports between the inlet ports and having an igniting device between each inlet port and the succeeding exhaust port, said cylinder having a port adapted to register with the inlet and exhaust ports and with the igniting devices and a connection between the segments for moving the piston segment relatively to the cylinder segment to cause the piston to move into and out of the cylinder once during the travel of the cylinder through an arc of 90 degrees.

3. An engine of the character specified, comprising a casing having an annular passage, a shaft journaled at the axis of the passage, a pair of segments mounted on the shaft, one of the segments being keyed thereto and the other loose thereon, a cylinder in the annular passage in connection with the first named segment to move therewith, a piston coöperating with the cylinder and connected to the other segment and moving therewith, means in connection with said other segment for preventing reverse movement thereof, and a connection between the segments for moving the piston segment relatively to the cylinder segment to cause the piston to move into and out of the cylinder during the travel of the cylinder piston, the casing having inlet and exhaust ports, and igniting devices, and the cylinder having a port adapted to register therewith.

SAMUEL HENDERSON GRIMMETT.
    FRED GOETTE.

Witnesses:
    R. B. SCATTERDAY,
    KATE E. NORTON.